United States Patent [19]

Szilard

[11] Patent Number: 4,880,010

[45] Date of Patent: Nov. 14, 1989

[54] METHOD OF AND APPARATUS FOR ULTRASONIC IMAGING

[76] Inventor: John Szilard, 12 Belvoir Drive, Loughborough, LE11 2SW, United Kingdom

[21] Appl. No.: 170,387

[22] PCT Filed: Jul. 9, 1987

[86] PCT No.: PCT/GB87/00485

§ 371 Date: May 12, 1988

§ 102(e) Date: May 12, 1988

[87] PCT Pub. No.: WO88/00710

PCT Pub. Date: Jan. 28, 1988

[30] Foreign Application Priority Data

Jul. 18, 1986 [GB] United Kingdom ............... 8617567

[51] Int. Cl.$^4$ ............................................. A61B 8/00
[52] U.S. Cl. ............................. 128/661.01; 73/625
[58] Field of Search .......... 128/660.09, 661.01; 73/625–628; 310/336, 368

[56] References Cited

U.S. PATENT DOCUMENTS 3,911,730 10/1975 Niklas ........................................ 73/67
4,112,411 9/1978 Alais et al. ................................ 340/1
4,131,024 12/1978 Merrich et al. ......................... 73/606
4,671,293 6/1987 Shaulov ................................. 128/660

FOREIGN PATENT DOCUMENTS

2946485-A  5/1981  Fed. Rep. of Germany .
2579761   10/1987  France .
2048476-A  3/1980  United Kingdom .
2053475-A  7/1980  United Kingdom .
2075797-A  5/1981  United Kingdom .
2160793-A  4/1985  United Kingdom .

OTHER PUBLICATIONS

G. Gunarathne and J. Szilard, "A Real Time High Frame Rate Ultrasonic Imaging System", Ultrasonics International, (London 1985).
J. Fraser et al., "A Two-Dimensional Electronically Focused Imaging System", 1974, IEEE Ultrasonics Symposium Proceedings, (Stanford, Calif.).

*Primary Examiner*—Francis Jaworski
*Attorney, Agent, or Firm*—Kinney & Lange

[57] ABSTRACT

Ultrasonic imaging is effected using a line focused transmitter 1 and a line focused receiver 3 arranged with their focal lines ($f_T$, $f_R$) crossing, and controlled such that the crossing point P of the focal lines scans a target to be imaged.

17 Claims, 4 Drawing Sheets

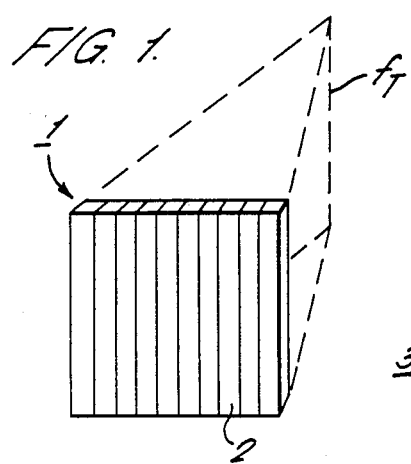
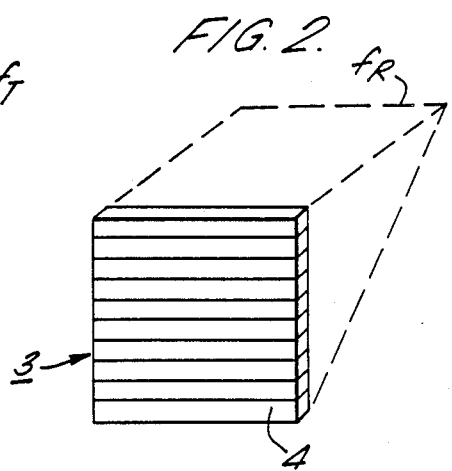
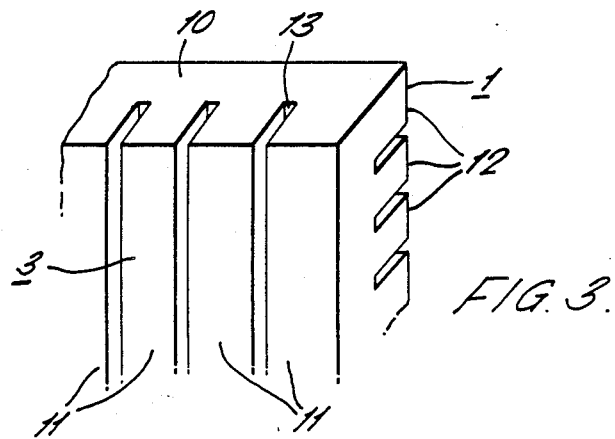
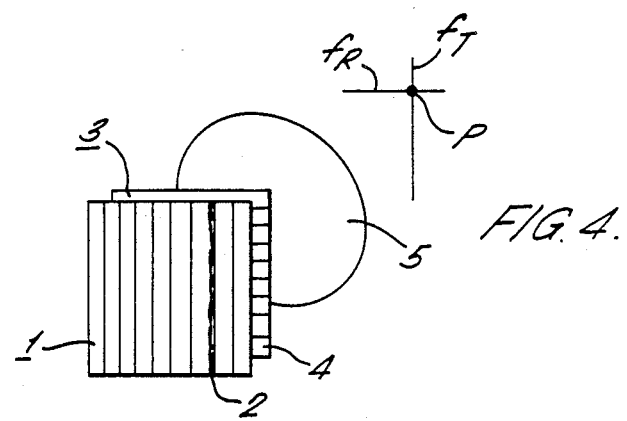

METHOD OF AND APPARATUS FOR ULTRASONIC IMAGING

BACKGROUND OF THE INVENTION

1. Field of the Invention

This invention relates to a method of and apparatus for ultrasonic imaging.

Ultrasonic imaging is a technique used in non-destructive testing and examination and in medical diagnostics.

2. Description of the Prior Art

Existing apparatus for forming images using ultrasonic acoustic waves uses either the so-called B-scan method which involves imaging a plane containing the axis of an ultrasonic beam or the so-called C-scan method in which a plane normal to the ultrasonic beam is imaged.

SUMMARY OF THE INVENTION

According to the invention there is provided a method of ultrasonic imaging comprising the steps of transmitting a line focused acoustic wave pulse signal into a body; detecting returns from any target encountered in the body by the transmitted signal using a line focused receiver having a focal line crossing the focal line of the transmitter at a crossing point; controlling the transmitter and receiver to cause said crossing point to scan a surface within the body; and producing an image from the signals received by the receiver.

The method of the invention, hereinafter referred to as the U-scan method, will produce highly focused images of either the B-scan or C-scan plane, or any intermediate plane, with high resolution.

Also according to the invention there is provided apparatus for ultrasonic imaging comprising a line focused acoustic wave pulse transmitter; a line focused acoustic wave pulse receiver arranged with its focal line crossing the focal line of the transmitter at a crossing point; control means controlling the transmitter and receiver such that said crossing point scans a surface to be imaged, and displaying means controlled by the receiver to produce an image.

BRIEF DESCRIPTION OF THE DRAWINGS

This invention will now be described by way of example with reference to the drawings, in which:

FIG. 1 shows an acoustic wave transmitter,

FIG. 2 shows an acoustic wave receiver;

FIG. 3 shows part of a combined acoustic wave transmitter and receiver;

FIG. 4 illustrates operation of an apparatus according to this invention utilizing an acoustic lens for focusing;

DETAILED DESCRIPTION OF THE PREFERRED EMBODIMENTS

Figure 5:
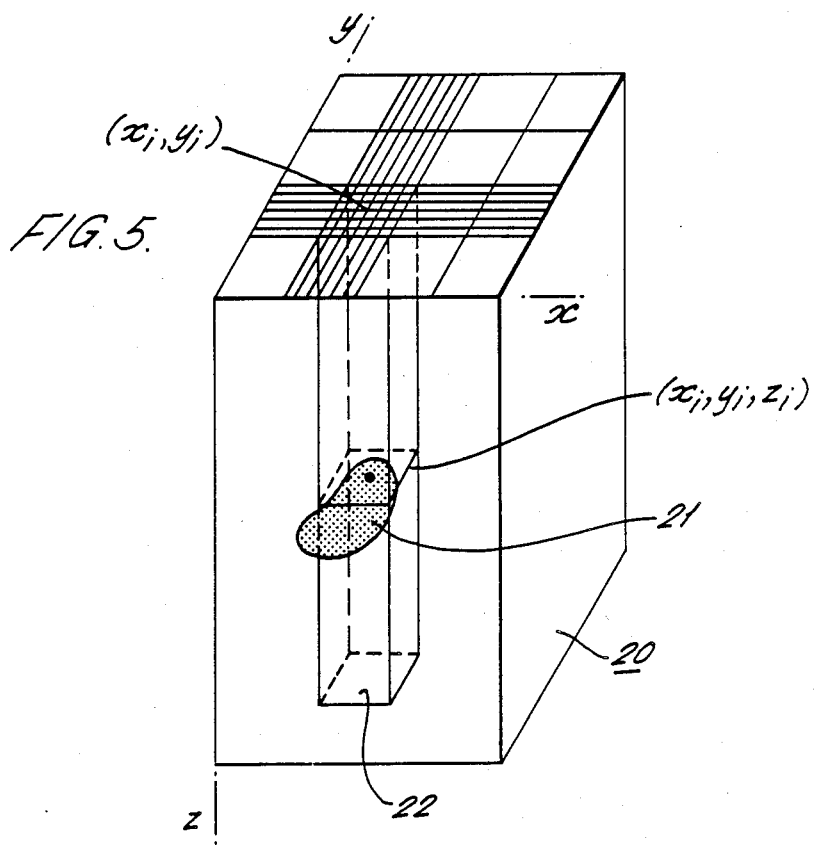
FIGS. 5 to 9 illustrate use of the method of this invention for examination of the whole volume of a test object.

Referring now to the drawings, FIG. 1 shows an ultrasonic wave pulse signal transmitter 1 comprising a plurality of elements 2 arranged to be operated using phase delay techniques to focus the outputs of the elements 2 to a line $f_T$. Such focusing can be effected using known techniques which will not be described in detail herein. FIG. 2 shows an ultrasonic wave receiver 3 comprising a plurality of elements 4 arranged to receive acoustic waves from a line object $f_R$. For use in scanning a target to be imaged, the transmitter 1 and receiver 3 are arranged either side-by-side, or superimposed one on the other, and with their focal lines $f_T$ and $f_R$ crossing, preferably at right angles, to define a crossing point P (see FIG. 4). During operation each transmitted pulse from the transmitter 1 produces a return to the receiver 3 if a target is present at the crossing point P, returns received by the receiver 3 being used to produce an image of the target on a visual display (see FIGS. 10 and 11). To produce an image of the complete target, focusing of the transmitter 1 and receiver 3 is controlled such that either the line $f_T$ or the line $f_R$ is initially held stationary while the other line is scanned therealong thereby producing a series of crossing points P to constitute one line of the visual display. The initially stationary line is then stopped by a predetermined amount to a new position and the scanning by the other line repeated to produce a second line for the visual display. This procedure is repeated until a complete matrix of crossing points P in the target plane has been produced, and thus a complete image of that plane produced on the visual display.

The initially stationary focal line can be stepped in a plane perpendicular to the axis of the transmitter to produce an orthographic image, similar to a C-scan, but of high resolution due to focusing, or in a plane parallel to the axis by changing the focal distance, producing a coaxial image, similar to a B-scan, again of high resolution due to focusing. Otherwise the initially stationary focal line may be shifted combining the two above mentioned directions, to produce scanning of an oblique plane. In principle, any arbitrary surface could be scanned and imaged.

After any complete plane has been scanned, the scan plane can be shifted parallel to itself, together with appropriate shifting of the display, whereby a volume can be scanned, and a pseudo-3D image produced.

As mentioned above, the transmitter 1 and receiver 3 can be placed side-by-side, or can be superimposed and bonded together. Otherwise, as shown in FIG. 3, the transmitter and receiver can be provided as a unitary structure comprising a substrate 10 having electrodes 11 and 12 on opposite faces, the electrodes 11 and 12 being divided into strip elements by grooves 13 in the substrate 10, the grooves 13 serving to reduce cross-talk. Materials suitable for making the transmitter and receiver are well known, such materials being, for example, piezoelectric crystals like quartz and lithium sulphate, piezoelectric ceramics like barium titanate, lead zirconate titanate and lead metaniobate, and piezoelectric plastics materials like PVDF. Combinations of materials can be used; for example a ceramic transmitter with a plastics material receiver bonded to it. If a plastics material substrate is used the electrodes can be applied by screen printing or deposition using a mesh, or by first depositing a single electrode sheet followed by etching to obtain the required elements. With an arrangement as shown in FIG. 3, the grooves 13 can be omitted, that is only the electrodes separated into elements, if the effect of cross-talk is removed by subsequent processing of the signals producing the visual display. For purposes of damping, the back of any transmitter or receiver or combined structure can in known manner, be covered with a layer of known suitable materials such as a resin loaded with a heavy material such as tungsten powder. Other materials found to be suitable for such damping purposes are dental amalgam, and indium with or without alloying metals and with or without added tungsten powder.

It will be appreciated that transmitter and receivers other than piezoelectric devices can be used in carrying out the method of this invention.

The methods and apparatus described above utilise electronic focusing and phase delay techniques for operation of the transmitter and receiver.

If only a C-scan is required, a simplified form of apparatus as shown in FIG. 4 can be used. This apparatus utilises an acoustic lens 5 to form an image of the transmitter 1 at a certain depth in an object to be imaged.

When a single element 2 of the transmitter 1 is energised it insonifies its focal line $f_T$, and returns from any target at the certain depth will be imaged on the receiver 3. However, each element 4 of the receiver 3 will pick up only returns coming from its focal line $f_R$ in the target area, i.e. the area covered by the intersection of the respective focal lines of the transmitter and receiver elements, forming one crossing point P (pixel). Returns from distances other than that of the focal line of the transmitter 1 in the object can be gated out. Thus only one pulse transmitter is required, which is switched from one element 2 of the transmitter 1 to the next, and the gated and rectified outputs of the receiver 4 used to produce the visual display.

If required an acoustic lens can be used to obtain scanning of an area different from that of the transmitter/receiver used.

Referring now to FIGS. 5 to 9, use of the method of this invention for full examination of the volume of a test body will be described.

The methods to be described comprise three stages, namely a first search stage in which a fast scanning of the whole volume of the test body is made with crude resolution, and if no target is found the examination is terminated; if a target (or targets) is found then in a second focus stage the transmitter and receiver are focused onto the target discovered; and then in a third stage scanning is carried out to follow the contours of the target whereby a corresponding image of the target can be produced on the visual display.

FIG. 5 shows a test body 20 in the form of a rectanguloid block having a target defect 21 therein which is to be discovered and imaged.

The search stage can be carried out in one of three ways.

1. One face of the test body 20 is divided into an array of search units each characterised by respective co-ordinates $(x_i, y_i)$. The transmitter and receiver elements are energised in parallel (not focused), radiating and receiving plane wave pulses and looking down each search unit $(x_i, y_i)$ in sequence into the respective search column 22. Any target 21 giving a return is noted by its coordinates $(x_i, y_i, z_i)$.

2. The transmitter and receiver are used with the focus deliberately degraded to a much larger area, say four or five times that of the finest possible. Scanning is then in correspondingly larger steps, taking a correspondingly shorter time. In this way th volume is searched either in crude B-scan or C-scan layers. Any targets 21 found are noted as before.

3. A plane wave pulse is transmitted, then first elements in one direction are used as receivers to visualize all targets 21 employing the techniques described in GB-A-2160973 and in the paper "A real time high frame rate ultrasonic imaging system" (G. P. P. Gunarathne and J. Szilard, Ultrasonics International '85, London), followed by a similar operation using elements of the other direction, the resulting images being stored.

In the above operation two orthogonal projections of the whole test body 20 are produced corresponding to the two directions of elements, taking only two pulses, i.e. a few hundred microseconds. These two projections are displayed. In simple cases they might suffice in themselves, but if complex geometry of the target or targets makes it necessary a more detailed examination producing an unambiguous image can be carried out.

In the focus stage, beginning with one of the targets 21 found, a sharply focused C-scan is set up in the appropriate search plane $(x_i, y_i, z_i)$ corresponding to the top of the target found in that search column 22 (Search Option 1) or search focal volume (Search Option 2), or determined from the two orthogonal projections (Search Option 3). Scanning continues until the top of the target 21 is exactly located and imaged.

Figure 6:
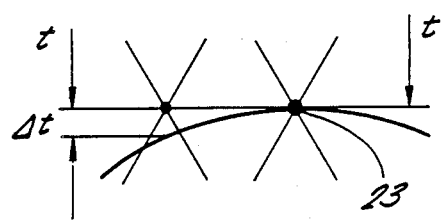
Figure 7:
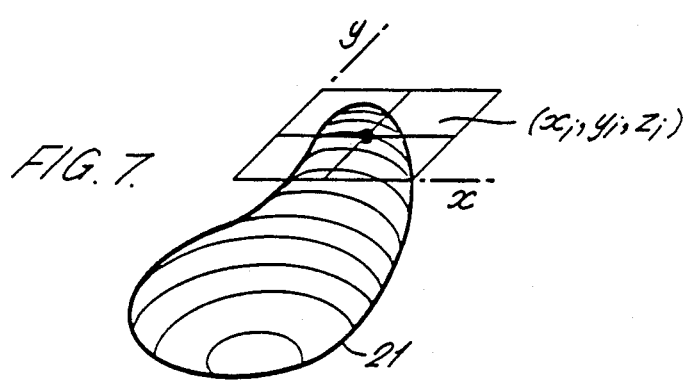
Figure 8:
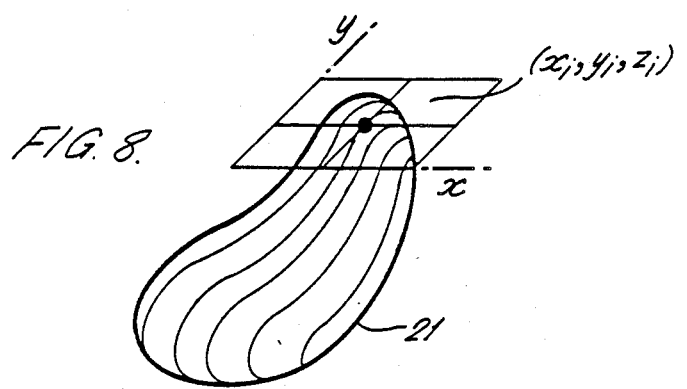
Figure 9:
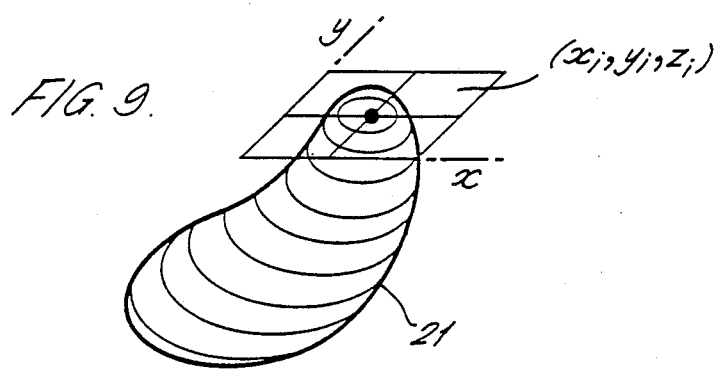

In the follow stage as shown in FIG. 6, scanning continues, and by monitoring the time of flight of the transmitted pulse, as the distance of the target 21 changes by $\Delta t$ from the initial contact position 23, the focal distance can be continually re-adjusted thereby following the contours of the target 21, for which operation there are three possibilities:

(a) Mapping the contours of the target 21 in an (x,z) plane (FIG. 7);

(b) Mapping the contours of the target 21 in a (y,z) plane (FIG. 8);

(c) Mapping contour lines of the target 21 equidistant from the transmitter, i.e. (x.y) plane (FIG. 9).

When imaging of one target is finished, the operation is repeated in sequence on all targets present in the test body 20.

If the scanning results are stored either an axonometric (pseudo-3D) view can be displayed, or a section through any desired plane or surface produced and displayed.

Figure 10:
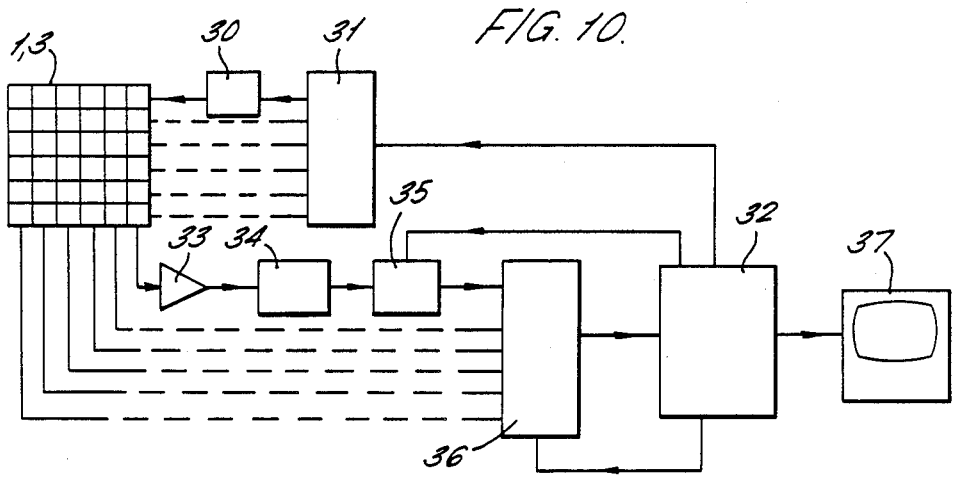
FIG. 10 is a block diagram of an apparatus according to this invention.

Referring now to FIG. 10, this is a block diagram of an apparatus according to this invention for carrying out a method as described above with reference to FIGS. 1 to 3 of the drawings.

The apparatus comprises a combined transmitter/receiver 1, 3, each element of the transmitter 1 being fed by an individual pulse generator 30. The pulse generators 30 are controlled by a timer and phase shifter 31 which is itself controlled by a microcomputer 32 which controls operation of the whole apparatus and also functions as a frame store. Returns received by the elements of the receiver 3 are passed by way of respective paths each comprising a pre-amplifier 33, a high speed digitiser 34 and a memory 35, to a processor 36 which serves to combine the received signals and process the signals as necessary before the supply thereof by way of the microcomputer 32 to a visual display 37 which in response to the received signals provides a display of any target detected by the transmitter/receiver arrangement 1, 3.

The apparatus described above can be provided as a self-contained system capable of effecting universal scanning (B-scan and C-scan) as described above with reference to FIGS. 1 to 3.

Figure 11:
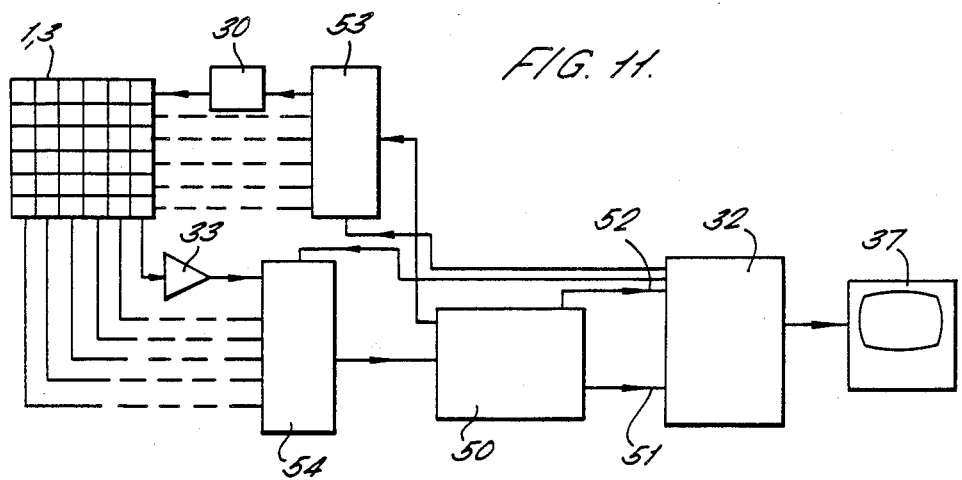
FIG. 11 is a block diagram of another apparatus according to this invention.

Referring now to FIG. 11, this is a block diagram of another apparatus according to this invention for carrying out a method as described above with reference to FIG. 4 of the drawings (C-scan only), the apparatus utilising an ultrasonic lens (5 in FIG. 4) and possibly being supplied as an accessory to a standard ultrasonic flaw detector with a monitor acting as a peak detector. Parts shown in FIG. 11 corresponding to parts shown in FIG. 10 have the same references.

With this apparatus a standard flaw detector 50, the monitor output 51 of which controls the visual display 37 by way of the microcomputer 32, has a second, analogue output 52 from which the microcomputer 32 determines the arrival times of echoes, whereby a 3D visual display can be produced as discussed above. The pulse generators 30 are controlled by a device 53 which serves to distribute trigger signals from the arrangement 50 under the control of the microcomputer 32. The returns are passed by their individual pre-amplifiers 33 to an analogue multiplexer 54 which feeds the arrangement 50 to produce the visual display and which is controlled by the microcomputer 32.

It will be appreciated that if a 3D visual display is not required then the second output 52 from the flaw detector 50 can be omitted.

I claim:

1. A method of acoustic imaging comprising the steps of:
    transmitting a line focused acoustic wave pulse signal obtained from a plurality of transmitting elements by phase delay techniques into a body; detecting return signals from any target encountered in the body by the transmitted wave pulse signal using a line focused receiver comprising a plurality of receiving elements focused using phase delay techniques and having a focal line crossing the focal line of the transmitter at a crossing point;
    electronically controlling the transmitter and receiver to cause said crossing point to scan a surface within the body; and
    producing an image from the return signals received by the receiver.

2. A method as claimed in claim 1, in which control of the transmitter and receiver to cause said crossing point to scan a surface of any target encountered comprises:
    initially holding the focal line of either the transmitter or the receiver stationary while the other focal line of the receiver or transmitter is scanned therealong to produce a series of crossing points to provide a line of the subsequently produced image, and then stepping the initially stationary focal line a predetermined amount to a new position and repeating the scanning by said other focal line to produce a second series of crossing points to provide a second line of the subsequently produced image, such procedure being repeated until a matrix of crossing points forming the image has been produced.

3. A method as claimed in claim 2, in which said initially stationary focal line is stepped in a plane perpendicular to the axis of the transmitter to produce an orthographic image.

4. A method as claimed in claim 2, in which said initially stationary focal line is stepped in a plane parallel to the axis of the transmitter by changing the focal distance of the transmitter or receiver producing the focal line, with the focal distance of the receiver or transmitter being changed accordingly.

5. A method as claimed in claim 2, in which after scanning of any surface said initially stationary focal line is shifted into a new plane parallel to that of the scanned surface and scanning repeated whereby a volume is scanned and a pseudo-3D image produced.

6. A method as claimed in claim 1, including a first search stage in which the whole volume of the body is scanned with crude resolution of the transmitter and receiver, in order to discover any targets in the body; a second focus stage in which the transmitter and receiver are focused onto a target discovered in the first search stage; and a third follow stage in which the target is imaged.

7. A method as claimed in claim 6, in which the first search stage is carried out by operating the transmitter and receiver in parallel, and in unfocused condition, to examine a column within the body defined by a specific surface area on the body, noting any targets encountered, and repeating such examination for as many specific surface areas on the body as necessary.

8. A method as claimed in claim 7, in which the first search stage is carried out by producing two orthogonal projections of the whole body.

9. A method as claimed in claim 6, in which the first search stage is carried out as for the third stage but with the focusing of the transmitter and receiver degraded whereby scanning can be affected in relatively large steps.

10. Apparatus for acoustic imaging comprising:
    a line focused acoustic wave pulse transmitter having a plurality of transmitting elements focused using phase delay techniques;
    a line focused acoustic wave pulse receiver having a plurality of receiving elements focused using phase delay techniques, arranged with its focal line crossing the focal line of the transmitter at a crossing point;
    control means controlling the transmitter and receiver such that said crossing point scans a surface to be imaged; and
    display means controlled by the receiver to produce an image.

11. Apparatus as claimed in claim 10, in which the transmitter and receiver each comprise a plurality of parallel elements.

12. Apparatus as claimed in claim 10, in which the transmitter and receiver are electronically focused.

13. Apparatus as claimed in claim 10, in which the transmitter and receiver are focused by means of an acoustic lens.

14. Apparatus as claimed in claim 10, wherein the transmitter and receiver comprises a unitary structure.

15. Apparatus as claimed in claim 14 in which the unitary structure comprising the transmitter and receiver has a layer of damping material thereon.

16. Apparatus as claimed in claim 15, in which the damping material is selected from the group consisting of dental amalgam, indium, indium with alloying metals, and indium with tungsten powder.

17. Apparatus as claimed in claim 11 including an acoustic lens whereby scanning of an area different from that of the transmitter is obtained.

* * * * *

UNITED STATES PATENT AND TRADEMARK OFFICE
CERTIFICATE OF CORRECTION

PATENT NO. : 4,880,010

DATED : November 14, 1989

INVENTOR(S) : John Szilard

It is certified that error appears in the above-identified patent and that said Letters Patent is hereby corrected as shown below:

Column 6, line 55, after "claim 14" insert --,--.

Column 6, line 62, delete "claim 11" and insert --claim 10--.

Signed and Sealed this

Second Day of July, 1991

Attest:

HARRY F. MANBECK. JR.

*Attesting Officer*  *Commissioner of Patents and Trademarks*